(12) United States Patent
Nagao et al.

(10) Patent No.: US 8,700,289 B2
(45) Date of Patent: Apr. 15, 2014

(54) STRADDLE TYPE VEHICLE

(75) Inventors: Tokinari Nagao, Shizuoka (JP); Atsushi Sawabuchi, Shizuoka (JP); Takashi Ashida, Shizuoka (JP); Tomokazu Takayanagi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1148 days.

(21) Appl. No.: 12/644,143

(22) Filed: Dec. 22, 2009

(65) Prior Publication Data
US 2010/0168985 A1 Jul. 1, 2010

(30) Foreign Application Priority Data
Dec. 26, 2008 (JP) ................................. 2008-332295

(51) Int. Cl.
*F02M 1/02* (2006.01)
*F02D 11/10* (2006.01)
*G05G 13/00* (2006.01)
*B60T 7/12* (2006.01)

(52) U.S. Cl.
USPC ........ 701/103; 200/61.89; 200/509; 200/510; 200/521; 200/522; 74/481; 74/488; 123/395; 123/396; 123/397

(58) Field of Classification Search
USPC ......... 123/395, 396, 397, 398, 399, 400, 402, 123/403, 198 DC; 701/103, 115; 200/61.86, 200/61.87, 61.89, 505, 509, 510, 520, 521, 200/522; 74/479.01, 482, 481, 488, 49, 74/501.6, 473.12
See application file for complete search history.

(56) References Cited

U.S. PATENT DOCUMENTS

| | | | | |
|---|---|---|---|---|
| 4,058,105 A | * | 11/1977 | Schellin et al. | 123/198 DC |
| 4,138,601 A | * | 2/1979 | Nakamura et al. | 200/61.85 |
| 4,155,418 A | * | 5/1979 | Tremblay et al. | 180/272 |
| 4,186,291 A | * | 1/1980 | Swanson | 200/61.86 |
| 4,213,513 A | * | 7/1980 | Beck | 180/272 |
| 4,838,113 A | * | 6/1989 | Matsushima et al. | 74/551.8 |
| 5,829,312 A | * | 11/1998 | Berg et al. | 74/502.2 |

(Continued)

FOREIGN PATENT DOCUMENTS

JP 53-013726 A 2/1978

OTHER PUBLICATIONS

Nagao et al.; "Straddle Type Vehicle"; U.S. Appl. No. 12/644,139, filed Dec. 22, 2009.

*Primary Examiner* — Stephen K Cronin
*Assistant Examiner* — Raza Najmuddin
(74) *Attorney, Agent, or Firm* — Keating & Bennett, LLP

(57) ABSTRACT

A snowmobile includes an engine, an engine power controller, an operation portion, an operation input detector, an operation amount detector, and a control portion. The control portion does not control the engine power controller based on an amount detected by the operation amount detector in a preliminary zone in which the operation amount detected by the operation amount detector is not more than a first operation amount. The control portion controls the engine power controller based on an operation amount detected by the operation amount detector if the operation amount is greater than the first operation amount. A second operation amount smaller than the first operation amount is set in the preliminary zone and the control portion determines whether operation of the operation portion is carried out based on whether operation corresponding to the second operation amount is detected by the operation input detector.

13 Claims, 8 Drawing Sheets

(56) References Cited

U.S. PATENT DOCUMENTS

| | | | |
|---|---|---|---|
| 6,159,059 A * | 12/2000 | Bernier et al. | 440/40 |
| 6,231,410 B1 * | 5/2001 | Bernier et al. | 440/40 |
| 6,551,153 B1 * | 4/2003 | Hattori | 440/87 |
| 6,699,085 B2 * | 3/2004 | Hattori | 440/87 |
| 7,195,527 B2 * | 3/2007 | Tani et al. | 440/87 |
| 2003/0163241 A1 * | 8/2003 | Kondo | 701/103 |
| 2003/0221668 A1 * | 12/2003 | Hashimoto et al. | 123/396 |
| 2006/0219218 A1 * | 10/2006 | Yuasa | 123/396 |
| 2007/0068490 A1 * | 3/2007 | Matsuda | 123/396 |
| 2009/0265076 A1 * | 10/2009 | Hirose | 701/103 |
| 2009/0288635 A1 * | 11/2009 | Watanabe et al. | 123/399 |

* cited by examiner

STRADDLE TYPE VEHICLE

BACKGROUND OF THE INVENTION

1. Field of the Invention

The present invention relates to straddle type vehicles and more specifically to a straddle type vehicle including an operation portion used to control driving of an engine.

2. Description of the Related Art

There are known straddle type vehicles including an engine and an operation portion that is operated by a rider to control driving of the engine. JP S53-13726 A discloses a snowmobile as such a straddle type vehicle. According to the disclosure of JP S53-13726 A, the snowmobile includes an engine and a throttle lever that is operated by a rider to control driving of the engine. The snowmobile is provided with a carburetor used to supply fuel into an intake path for the engine. The carburetor is provided with a throttle valve that can open/close the intake path. The throttle valve is connected to the throttle lever by a Bowden cable (wire). The Bowden cable is moved in response to the movement of the throttle lever when the throttle lever is operated by a rider. The throttle valve is opened/closed according to the movement of the Bowden cable, so that the amount of air-fuel mixture to be taken into the engine is regulated.

The snowmobile disclosed by JP S53-13726 includes a lever switch used to detect the presence/absence of operation input to a throttle lever. The lever switch detects operation input before the throttle lever is rotated in response to operation by a rider.

SUMMARY OF THE INVENTION

As in the snowmobile disclosed by JP S53-13726 A, operation input is detected by the lever switch before the throttle lever is rotated, so that the rider's explicit intention of operation can be confirmed. However, it is difficult to detect operation input by the lever switch for a short period before the rotation of the throttle lever starts.

Unlike the arrangement disclosed by JP S53-13726 A in which the throttle valve is controlled by a mechanical wire, a throttle valve may be controlled electrically. In this case, no wire is provided between a throttle lever and the throttle valve, and therefore, a force required for operating the throttle lever is reduced. This makes it more difficult to detect timing before the rotation of the throttle lever starts.

In view of the above, a straddle type vehicle according to a preferred embodiment of the present invention includes an engine, an engine power controller, an operation portion, an operation input detector, an operation amount detector, and a control portion. The engine power controller controls driving of the engine. The operation portion is arranged to control the engine. The operation input detector detects whether the operation portion is operated. The operation amount detector electrically detects the operation amount of the operation portion. The control portion controls the engine by controlling the engine power controller based on the detection results of the operation input detector and the operation amount detector. The control portion does not control the engine power controller based on the operation amount detected by the operation amount detector in a first region in which the operation amount detected by the operation amount detector is at most equal to a first operation amount, a second operation amount smaller than the first operation amount is set in the first region, and if an operation amount detected by the operation amount detector is greater than the first operation amount, the control portion controls the engine power controller based on the operation amount detected by the operation amount detector, provided that operation corresponding to the second operation amount is detected by the operation input detector.

Thus, a preferred embodiment of the present invention provides a vehicle that achieves engine control according to the rider's intention by clearly determining whether the operation portion is operated by the rider.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
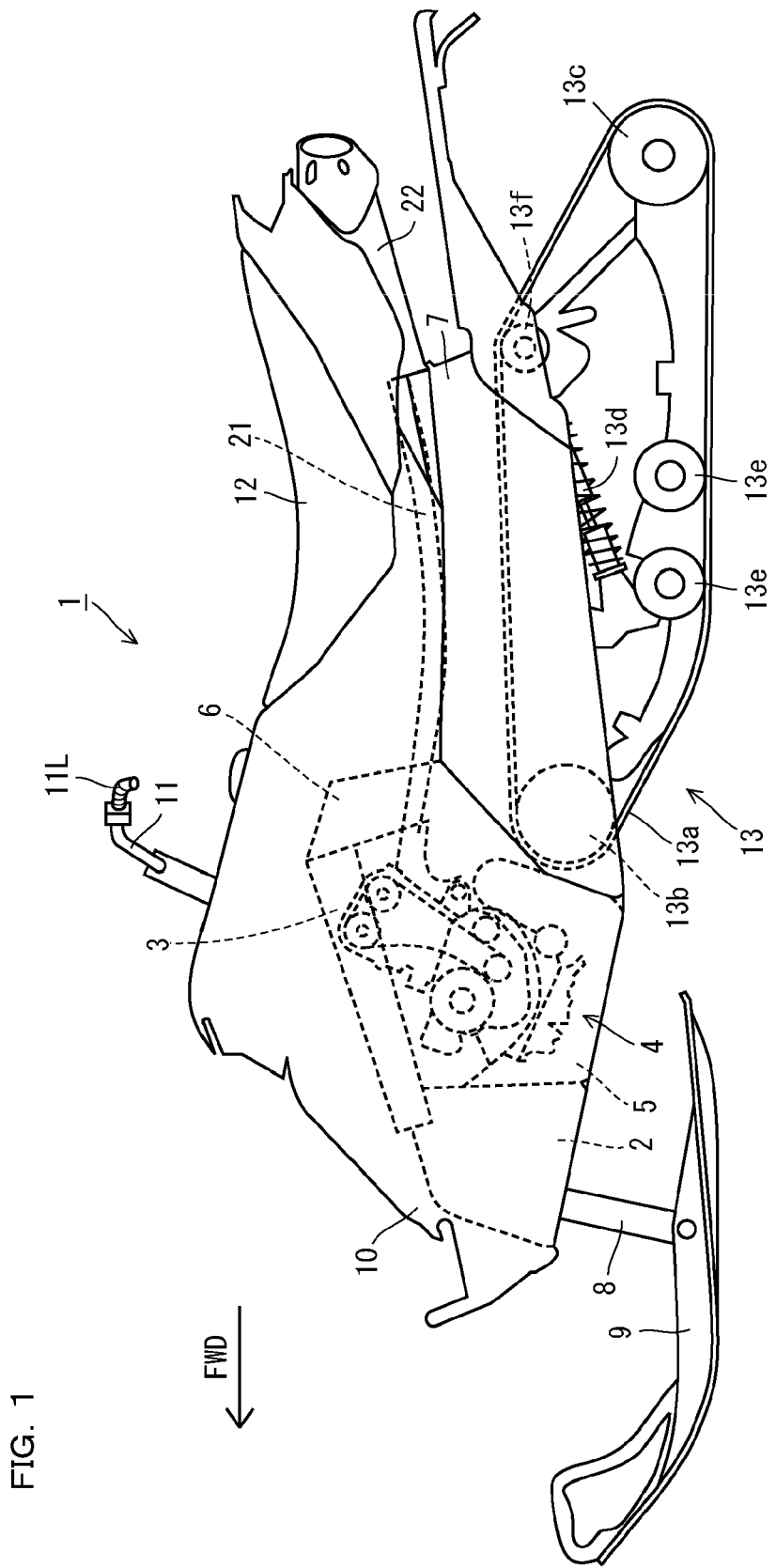
FIG. 1 is a side view of an entire structure of a snowmobile according to a preferred embodiment of the present invention.

Preferred embodiments of the present invention will be described. According to the preferred embodiments, a snowmobile will be described as an example of a straddle type vehicle according to the present invention. In the drawings, the arrow FWD refers to the forward advancing direction of the snowmobile 1. In the following description, the "front-back" direction and the "right" and "left" refer to these directions viewed from a rider on the snowmobile 1 unless otherwise specified.

FIG. 1 is a left side view of an entire structure of the snowmobile 1 according to a first preferred embodiment of the present invention. As shown in FIG. 1, a front frame 2 is provided in the front portion of the vehicle. A main frame 3 is connected to the upper portion of the front frame 2. The main frame 3 extends backward and upward. An under frame 5 is connected to the rear portion of the front frame 2. The rear portions of the main frame 3 and the under frame 5 are coupled by a coupling frame 6. A rear frame 7 is connected to the rear portions of the under frame 5 and the coupling frame 6. The rear frame 7 extends backward. The front frame 2, the main frame 3, the under frame 5, the coupling frame 6, and the rear frame 7 define the body frame.

A pair of right and left ski holding frames 8 is provided under the front frame 2. A pair of right and left skis 9 is provided at the lower end of the pair of ski holding frames 8. The skis 9 turn to the right and the left as the ski holding frames 8 turn to the right and the left. A front cowling 10 arranged to cover the front portion of the vehicle body is provided in front of and above the front frame 2.

A handle 11 connected to the ski holding frames 8 is provided above the main frame 3. As the handle 11 is turned, the skis 9 are turned to the right or left, so that the advancing direction of the snowmobile 1 can be determined.

A seat 12 is provided above the rear frame 7. A driving track 13 is provided under the rear frame 7. The driving track 13 includes a rubber track belt 13a, front and rear axles 13b and 13c provided inside the track belt 13a, and a suspension 13d used to absorb impact. The front axle 13b rotates the track belt 13a by driving power of the engine 4. This allows the snowmobile 1 to travel. A plurality of guide wheels 13e and 13f used to prevent the loosening of the track belt 13a are provided inside the track belt 13a.

The engine 4 is provided in front of the front axle 13b. The engine 4 is supported by the body frame.

Figure 2:
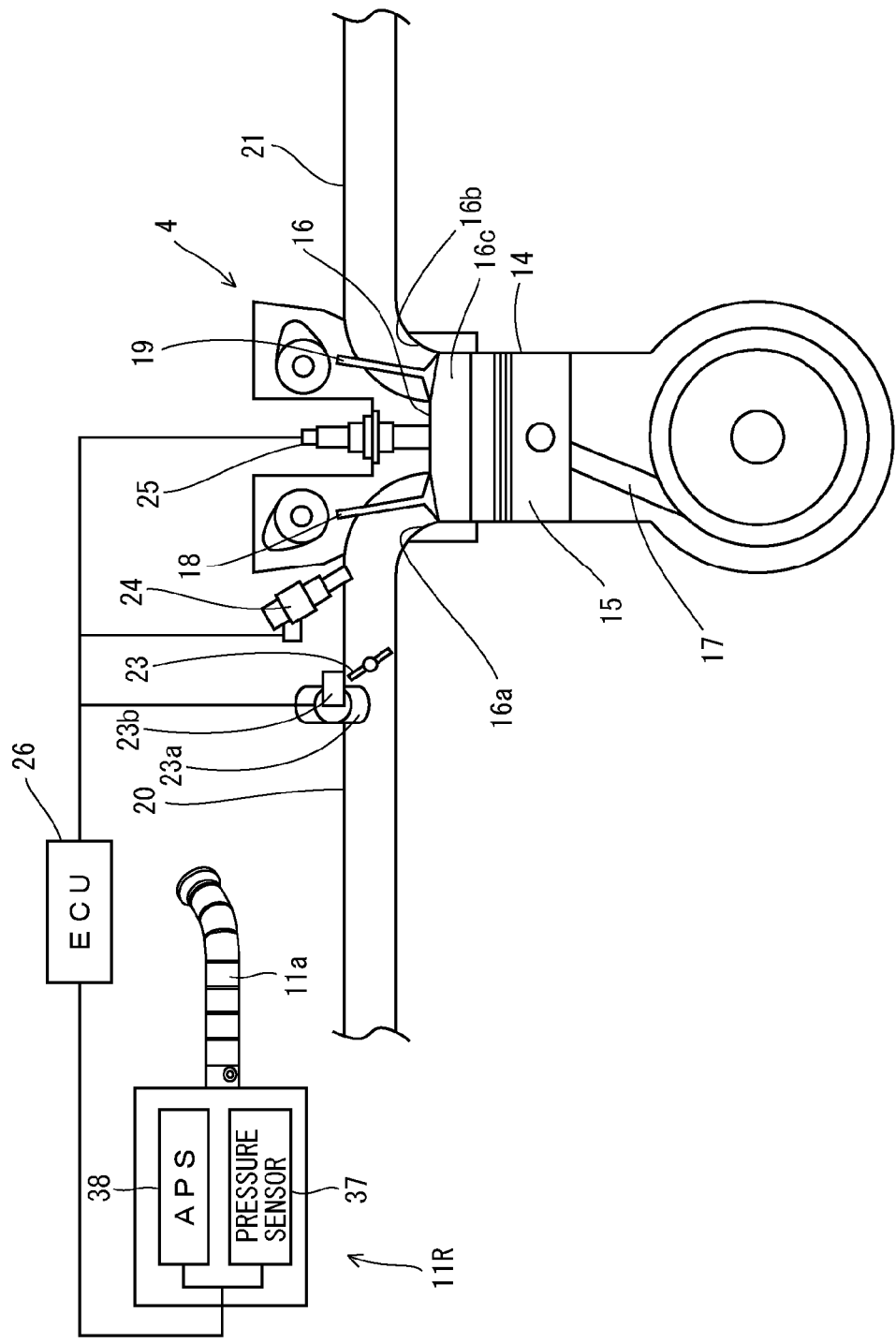
FIG. 2 is a system diagram of a peripheral structure of an ECU in the snowmobile.

FIG. 2 is a system diagram of the engine 4 and a peripheral structure of an ECU (Engine Control Unit) 26. As shown in FIG. 2, the engine 4 includes a cylinder 14, a piston 15 arranged to move in the vertical direction in the cylinder 14 and a cylinder head 16 provided above the cylinder 14. One end of a connecting rod 17 is rotatably attached to the piston 15. The cylinder head 16 is arranged to close one opening of the cylinder 14. The cylinder head 16 includes an intake port 16a and an exhaust port 16b. The intake and exhaust ports 16a and 16b are provided with an intake valve 18 and an exhaust valve 19, respectively. A combustion chamber 16c is provided in the lower portion of the cylinder head 16.

The intake port 16a is provided to supply an air-fuel mixture containing air and fuel to the combustion chamber 16c. The intake port 16a is connected with an intake pipe 20. The exhaust port 16b is arranged to discharge residual gas after combustion from the combustion chamber 16c. An exhaust pipe 21 is connected to the exhaust port 16b. A muffler 22 is connected to the rear end of the exhaust port pipe 21 as shown in FIG. 1.

As shown in FIG. 2, a throttle valve 23 is attached to the intake pipe 20 so that it can be opened/closed. The throttle valve 23 is an example of the "intake control valve" according to a preferred embodiment of the present invention. The throttle valve 23 is arranged to control driving of the engine 4. The throttle valve 23 rotates to control the open state and the closed state of the intake pipe 20 and regulates the amount of air to be taken into the intake port 16a of the engine 4 from the intake pipe 20.

A TPS (Throttle Position Sensor) 23a that detects the rotation position of the throttle valve 23 is provided near the throttle valve 23 of the intake pipe 20. A valve driving motor 23b that drives the throttle valve 23 is provided near the TPS 23a. The throttle valve 23 is an example of the "engine power controller" and the "intake control valve" according to a preferred embodiment of the present invention. The TPS 23a is an example of the "control state detector" and the "opening/closing detector" according to a preferred embodiment of the present invention. The valve driving motor 23b is an example of the "engine power controller" and the "control valve driving portion" according to a preferred embodiment of the present invention.

An injector 24 that injects fuel toward the engine 4 is attached between the throttle valve 23 in the intake pipe 20 and the intake port 16a. An ignition plug 25 used to ignite air-fuel mixture from the intake port 16a is attached to the combustion chamber 16c.

An ECU (Engine Control Unit) 26 that receives a detection signal transmitted from the TPS 23a is connected to the TPS 23a. The ECU 26 is an example of the "control portion" according to a preferred embodiment of the present invention. The ECU 26 controls driving of the engine 4 based on a predetermined opening degree for the throttle valve 23 during idling, a threshold opening degree in a preliminary zone (that will be described), a detection signal for the rotation amount (operation amount) of a thumb throttle 31 (that will be described) by the rider. More specifically, based on these parameters, the opening/closing of the throttle valve 23, the injection amount of fuel by the injector 24, and the ignition by the ignition plug 25 are controlled.

Figure 3:
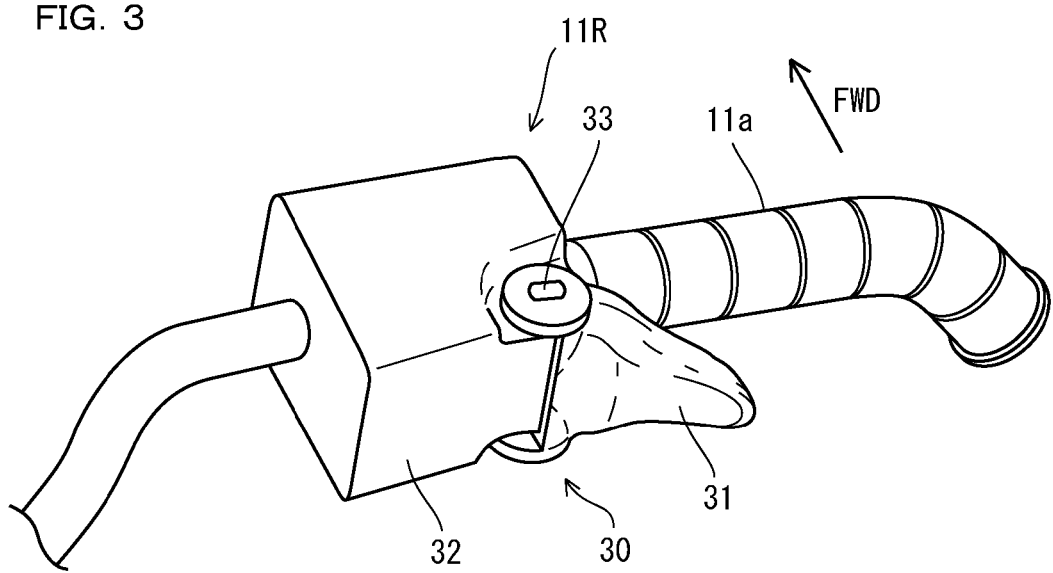
FIG. 3 is a perspective view of a handle.

FIG. 3 is a perspective view of a right handle 11R. As shown in FIG. 3, the right handle 11R includes a grip 11a grasped by the rider and an operation portion 30 provided near the grip 11a. The operation portion 30 is operated by the right hand of the rider to control driving of the engine 4. More specifically, the operation portion 30 controls driving of the engine 4 by controlling the open/closed state of the throttle valve 23. The operation portion 30 includes a resin thumb throttle 31 operated by the rider's right hand and a case 32 that supports the thumb throttle 31. The thumb throttle 31 is rotatably supported at the case 32. The thumb throttle 31 is an example of the "operation portion" and the "throttle lever" according to a preferred embodiment of the present invention.

In the specification, the throttle lever refers to an operation tool provided separately from the grip 11a in the vicinity of the grip 11a and used to control driving of the engine 4. More specifically, in the described arrangement, driving of the engine is not controlled by operating the grip 11a itself but a separate operation tool is provided near the grip 11a. The operation tool is not limited to such a rotational lever or any particular kind.

The handle 11 includes a left handle 11L (see FIG. 1) symmetrically positioned to the right handle 11R. However, the left handle 11L does not include the operation portion 30.

Figure 4:
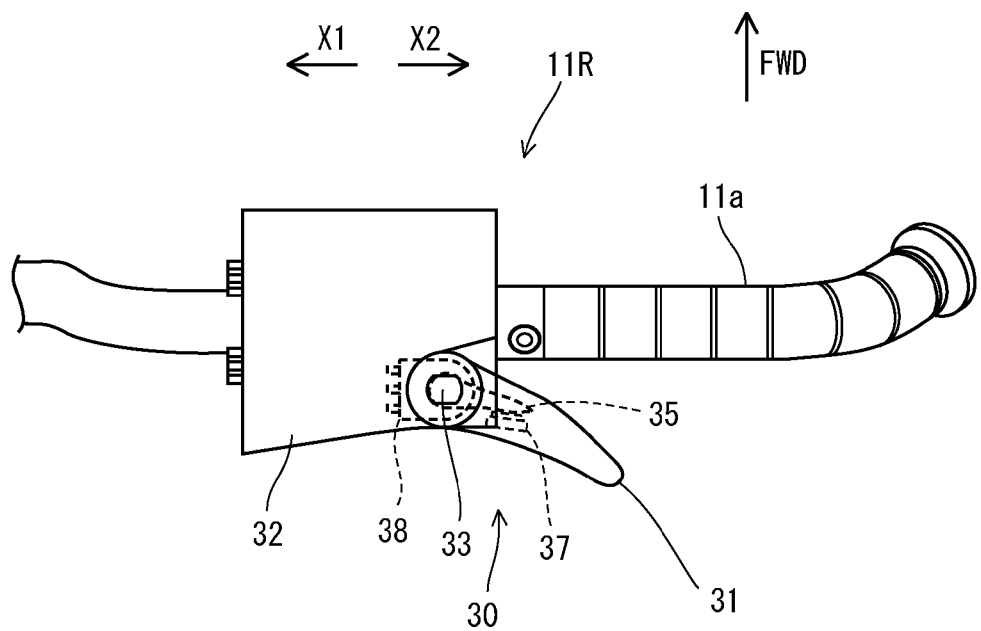
FIG. 4 is a plan view of the handle.

FIG. 4 is a plan view of the right handle 11R. As shown in FIG. 4, the grip 11a extends to the right of the vehicle (in the X2-direction). The thumb throttle 31 extends rightward and backward (opposite to the direction of the arrow FWD).

Figure 5:
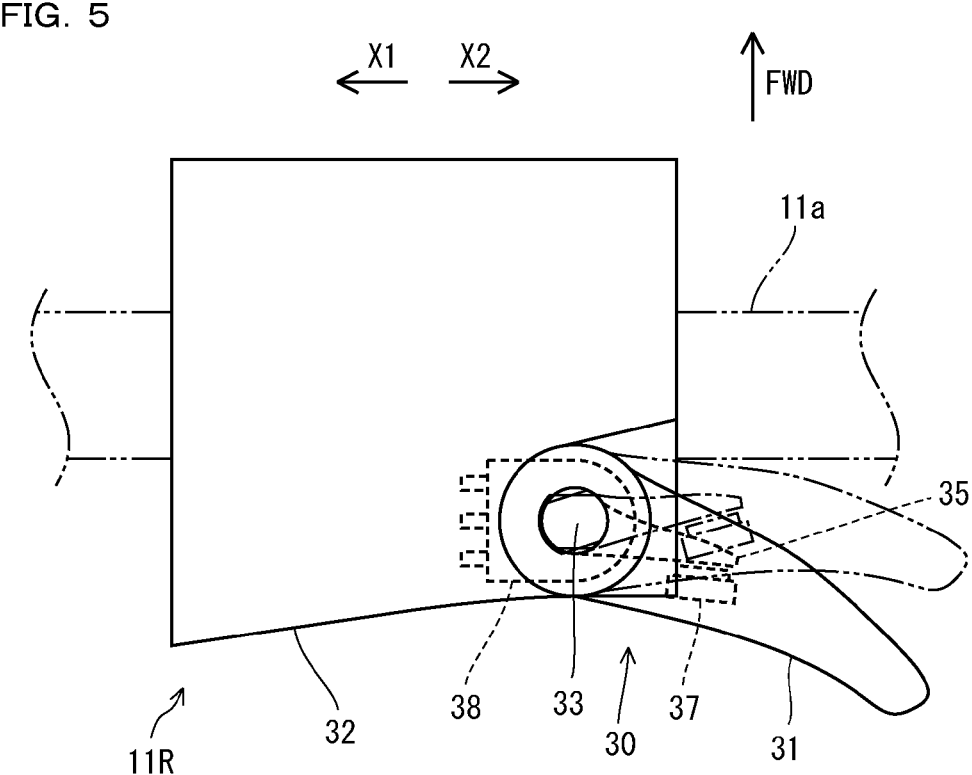
FIG. 5 is an enlarged plan view of the handle.

FIG. 5 is an enlarged plan view of the right handle 11R. As shown in FIG. 5, the thumb throttle 31 can rotate in the horizontal direction around the rotation shaft 33. The rotation shaft 33 is preferably made of metal and rotatably attached to the resin case 32. The rotation shaft 33 is provided behind the grip 11a. The rotation shaft 33 is provided in a position nearer to the rider on the snowmobile 1 than the grip 11a. The position of the rotation shaft 33 is not particularly limited. The rotation shaft 33 may be provided ahead of the grip 11a.

The rider controls the thumb throttle 31 by the thumb of the right hand while grasping the grip 11a by the right hand. When the rider pushes the thumb throttle 31 forward by the thumb of the right hand, the thumb throttle 31 is rotated forward.

Figure 6:
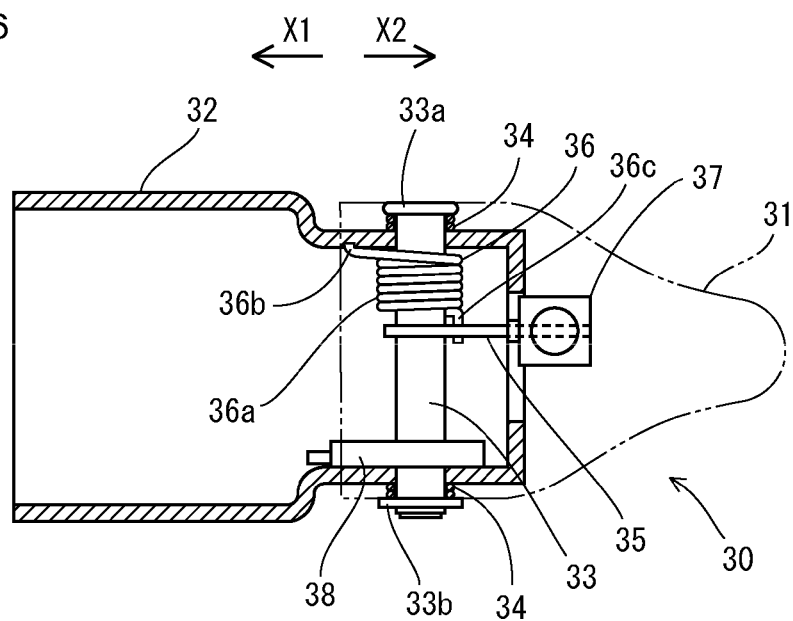
FIG. 6 is a rear sectional view of an internal structure of an operation portion.

FIG. 6 is a rear sectional view of an internal structure of the operation portion 30. As shown in FIG. 6, a flange 33a is provided at the upper end of the rotation shaft 33. Two rubber O-rings 34 arranged to apply resistance to the rotation operation of the thumb throttle 31 are provided between the flange 33a and the upper surface of the case 32. A flange 33b is provided at the lower end of the rotation shaft 33. Further two O-rings 34 arranged to apply resistance to the rotation operation of the thumb throttle 31 are provided between the flange 33b and the lower surface of the case 32.

An end of a metal arm 35 is attached (e.g., welded) to the rotation shaft 33. The arm 35 extends outward (in the X2-direction) in the widthwise direction of the vehicle from the connection portion with the rotation shaft 33. The other end of the arm 35 is fixed to the thumb throttle 31. The arm 35 is therefore rotated integrally with the rotation operation of the thumb throttle 31. The arm 35 transmits the rotation operation of the thumb throttle 31 to the rotation shaft 33.

A torsion coil spring 36 includes a coil portion 36a provided around the rotation shaft 33. The torsion coil spring 36 has one end 36b hooked at the inner wall surface of the case 32. The other end 36c of the torsion coil spring 36 is in contact with the arm 35 from the front. In this way, the torsion coil spring 36 pressurizes the thumb throttle 31 backward through the arm 35. The pressurizing force of the torsion coil spring 36 causes the thumb throttle 31 to be rotated to the initial position on the backside when the operation force of the rider is not applied.

A pressure sensor 37 is provided in the thumb throttle near the end of the arm 35 on the outer side (in the X2-direction) in the widthwise direction of the vehicle. The pressure sensor 37 is an example of the "operation input detector" according to a preferred embodiment of the present invention. The pressure sensor 37 detects whether the rider operates the thumb throttle 31 by detecting an operation load applied to the thumb throttle 31. As shown in FIG. 5, when the rider rotates thumb throttle 31, the thumb throttle 31 is pushed forward (in the direction of the arrow FWD). The pressure is transmitted to the arm 35 from the thus pushed thumb throttle 31. The pressure sensor 37 detects the pressure and detects an operation load when the thumb throttle 31 is operated by the rider.

The ECU 26 determines whether operation of the thumb throttle 31 is carried out by the rider based on the operation load detected by the pressure sensor 37. As shown in FIG. 2, a detection signal for the operation load detected by the pressure sensor 37 is transmitted to the ECU 26. A threshold value is set for the load detected by the pressure sensor 37 and when the thumb throttle 31 is operated with a load greater than the threshold value, the ECU 26 determines that the thumb throttle 31 is operated by the rider.

As shown in FIG. 6, an APS (Accelerator Position Sensor) 38 is provided coaxially under the rotation shaft 33 in the case 32. The APS 38 is an example of the "operation amount detector" according to a preferred embodiment of the present invention. The APS 38 electrically detects the rotation amount of the thumb throttle 31. The rotation shaft 33 is inserted in the APS 38 and the APS 38 detects the rotation angle of the rotation shaft 33 from the initial position. Using the APS 38, the amount of operation of the thumb throttle 31 by the rider can be detected.

As shown in FIG. 2, the APS 38 transmits a detection signal for the operation amount of the thumb throttle 31 to the ECU 26. The ECU 26 calculates the opening degree of the throttle valve 23, a fuel injection amount and injection timing by the injector 24 and ignition timing by the ignition plug 25 based on the detection signals from the APS 38 and the TPS 23a. The ECU controls driving of the engine 4 based on the results of calculation. The ECU 26 controls the opening degree of the throttle valve 23. The ECU 26 controls the engine 4 as a result through the control of the throttle valve 23.

According to the present preferred embodiment, when the operation amount (accelerator opening degree) of the thumb throttle 31 detected by the APS 38 is not more than a prescribed value, the ECU 26 does not control the valve driving motor 23b based on the detected accelerator opening degree. A preliminary zone (electrically idle region) is set for the ECU 26. In the preliminary zone, if the thumb throttle 31 is operated by the rider, the accelerator opening degree is not reflected upon driving of the valve driving motor 23b. The preliminary zone is an example of the "first region" according to a preferred embodiment of the present invention. A preliminary zone opening degree is an upper limit for the preliminary zone. When the accelerator opening degree detected by the APS 38 is greater than the preliminary zone opening degree, the ECU 26 controls the valve driving motor 23b based on the accelerator opening degree. The preliminary zone covers the region between the state in which the thumb throttle 31 is not operated (when the accelerator opening degree is zero) and the state in which the APS 38 detects the preliminary zone opening degree.

In the preliminary zone, the ECU 26 maintains control so that the opening degree of the throttle valve 23 is at an idling opening degree. At the idling opening degree, the engine speed of the engine 4 can be maintained so that the rotation power of the engine 4 is not transmitted to the driving track 13. The power transmission member between the engine 4 and the driving track 13 is provided with a clutch that turns on/off power transmission. The clutch turns on/off in response to the engine speed of the engine 4. When the opening degree of the throttle valve 23 is regulated at the idling opening degree, the power of the engine 4 is not transmitted to the driving track 13. The ECU 26 controls the valve driving motor 23b so that the throttle valve 23 is maintained at the idling opening degree in the preliminary zone.

When the accelerator opening degree detected by the APS exceeds the preliminary zone opening degree, the ECU 26 controls the valve driving motor 23b so that the opening degree of the throttle valve 23 exceeds the idling opening degree. The state of the engine 4 changes from the idling state to a traveling state, and the snowmobile 1 starts to travel.

Figure 7:
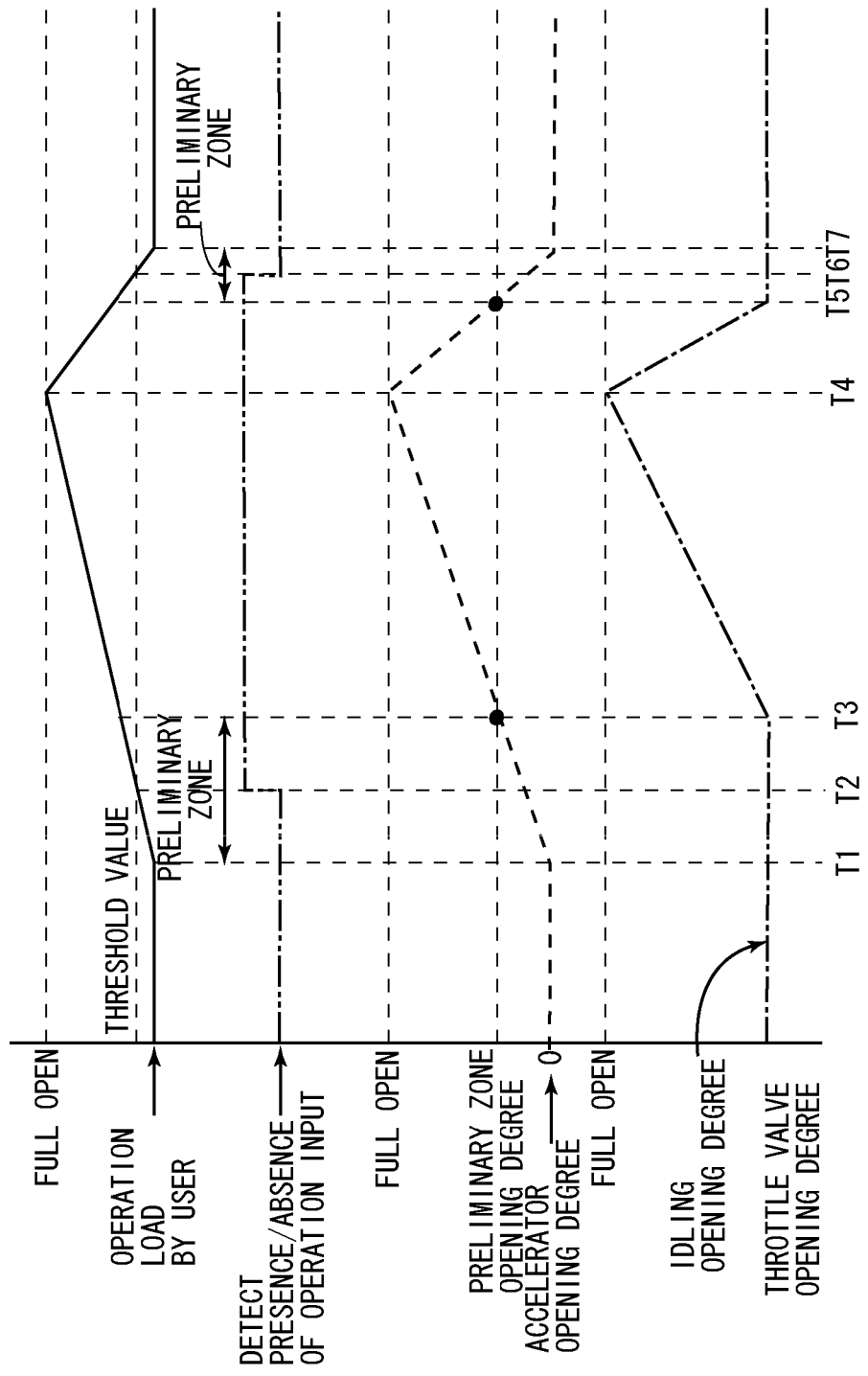
FIG. 7 is a timing chart for illustrating an example of how a throttle lever and a throttle valve operate.
Figure 8:
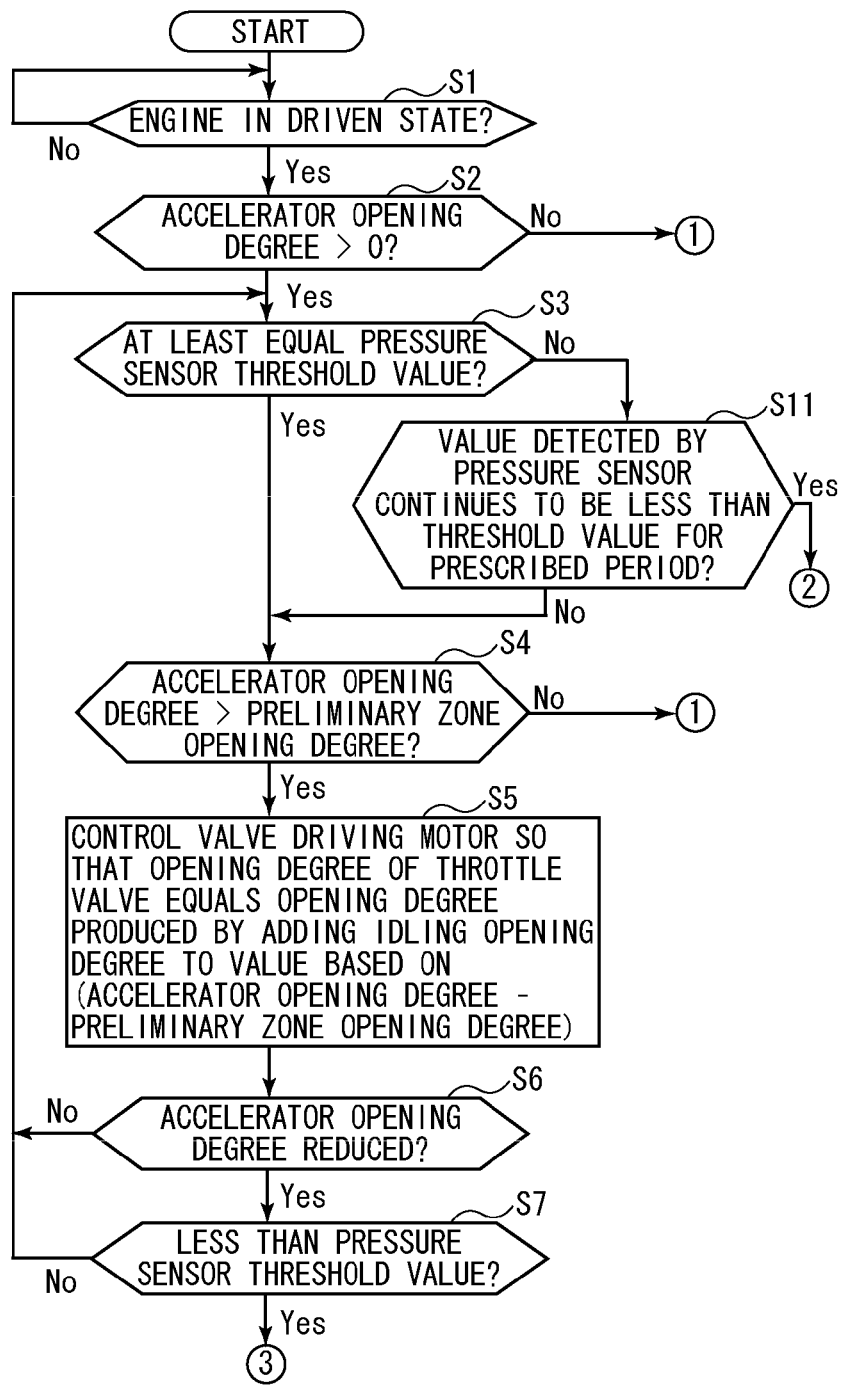
FIGS. 8 and 9 are flowcharts for illustrating a method of controlling the throttle valve using an ECU.
Figure 9:
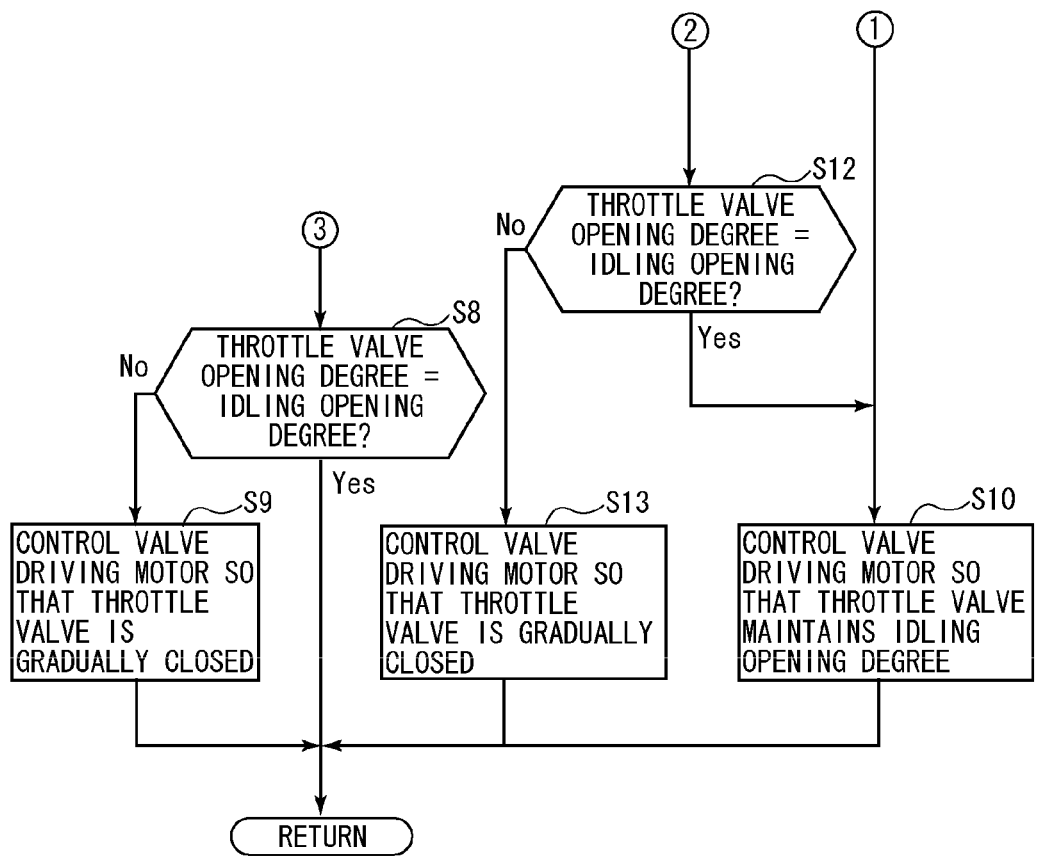

FIG. 7 is a timing chart for illustrating an example of how the thumb throttle 31 and the throttle valve 23 operate. In FIG. 7, the uppermost stage indicates change in load applied to the thumb throttle 31. The middle stage in FIG. 7 indicates change in the rotation amount of the thumb throttle 31 and the rotation shaft 33, in other words, change in the accelerator opening degree. In FIG. 7, the lowermost stage indicates the throttle valve opening degree. FIGS. 8 and 9 are flowcharts about the ECU 26 for illustrating a method of controlling the throttle valve 23. With reference to FIGS. 7 to 9, the content of the control of the throttle valve 23 by the ECU 26 will be described.

Referring to FIG. 8, it is determined by the ECU 26 in step S1 whether the engine 4 is in a driven state. If it is determined that the engine 4 is in a driven state (YES in step S1), the control proceeds to step S2. This timing comes in and before timing T1 in FIG. 7. In the state in and before timing T1 in FIG. 7, the accelerator opening degree detected by the APS 38 is zero and the throttle valve opening degree detected by the TPS 23a equals the idling opening degree. The engine 4 is in an idling state. The engine 4 is controlled to attain an idling state as an initial state before attaining a traveling state by the operation of the rider. If the engine 4 is not in a driven state (NO in step S1), the control returns to step S1, and the determination process is repeatedly carried out.

As shown in FIG. 7, between timings T1 and T2, the engine 4 is in an idling state. When the rider operates the thumb throttle 31 and a load is applied between timings T1 and T2, the rotation shaft 33 rotates together with the thumb throttle 31. The APS 38 detects the rotation angle of the rotation shaft 33 as an accelerator opening degree.

As shown in FIG. 8, it is determined by the ECU 26 in step S2 whether the accelerator opening degree (the rotation angle of the thumb throttle 31 and the rotation shaft 33) detected by the APS 38 is greater than zero. If it is determined that the accelerator opening degree is greater than zero (YES in step S2: in and after timing T1 in FIG. 7), and the control proceeds to step S3. As shown in FIG. 7, between timings T1 and T2, the ECU 26 controls the valve driving motor 23b so that the throttle valve 23 maintains the idling opening degree as the initial state.

As shown in FIG. 8, if it is determined that the accelerator opening degree is not greater than zero, in other words, if it is determined that the accelerator opening degree is zero (NO in step S2: in or before timing T1 in FIG. 7), the control proceeds to step S10 in FIG. 9. In step S10, the valve driving motor 23b is controlled so that the throttle valve 23 maintains the idling opening degree.

As shown in FIG. 7, between timings T1 to T2, when the rider increases the load applied to the thumb throttle 31, the rotation angle of the thumb throttle 31 and the rotation shaft 33 increases. The APS 38 detects the rotation angle of the rotation shaft 33, so that increase in the accelerator opening degree is detected.

As shown in FIG. 8, it is determined in step S3 whether the load applied to the thumb throttle 31 detected by the pressure sensor 37 is not less than a threshold value. The ECU determines whether operation of the thumb throttle 31 is carried out by the rider based on the determination. If the ECU 26 determines that the load applied to the thumb throttle 31 by the rider is not less than the threshold value (YES in step S3: in and after timing T2 in FIG. 7), the control proceeds to step S4.

If it is determined that the load applied to the thumb throttle 31 is less than the threshold value (NO in step S3: between timings T1 to T2 in FIG. 7), the control proceeds to step S11.

As shown in FIG. 7, the critical point for determining whether operation is carried out to the thumb throttle 31 is timing T2 in the period where the accelerator opening degree detected by the APS 38 changes from zero to a preliminary zone opening degree (from timings T1 to T3 in FIG. 7).

About a half of the rotation angle of the thumb throttle 31 when the accelerator opening degree reaches the preliminary zone opening degree (the rotation angle in timing T3 in FIG. 7) is defined as a reference angle. The load applied to the thumb throttle 31 that reaches the threshold value is a load necessary for the rotation angle of the thumb throttle 31 to reach the reference angle. In timing T2, the thumb throttle 31 attains about a half of the rotation angle where the accelerator opening degree reaches the preliminary zone opening degree, in other words, attains the reference angle. At the time, it is determined that the load applied to the thumb throttle 31 is not less than the threshold value and that operation input to the thumb throttle 31 by the rider has been carried out.

As shown in FIG. 7, in timings T2 to T3, if the rider increases the load applied to the thumb throttle 31 beyond the threshold value, the APS 38 detects the rotation angle of the rotation shaft 33. After the load applied to the thumb throttle 31 exceeds the threshold value (in and after timing T2 in FIG. 7), the control proceeds to step S4 as shown in FIG. 8. It is determined by the ECU 26 in step S4 whether the accelerator opening degree detected by the APS 38 is greater than the preliminary zone opening degree.

If it is determined that the accelerator opening degree is greater than the preliminary zone opening degree (YES in step S4: in and after timing T3 in FIG. 7), the control proceeds to step S5. If it is determined that the accelerator opening degree is not more than the preliminary zone opening degree (NO in step S4: in and before timing T3 in FIG. 7), the control proceeds to step S10 in FIG. 9, and the valve driving motor 23b is controlled so that the throttle valve 23 maintains the idling opening degree.

In step S5 shown in FIG. 8, the opening degree of the throttle valve 23 is controlled based on the accelerator opening degree output by the APS 38. More specifically, the preliminary zone opening degree is subtracted from the accelerator opening degree output by the APS 38 to produce a differential opening degree. The valve driving motor 23b is controlled so that the opening degree of the throttle valve 23 equals an opening degree produced by adding the idling opening degree to the valve opening degree calculated based on the differential opening degree.

As shown in FIG. 7, the ECU 26 controls the valve driving motor 23b in response to the accelerator opening degree that changes according to the operation of the thumb throttle 31 by the rider. The accelerator opening degree detected by the APS 38 is raised to an accelerator opening degree at which the thumb throttle 31 reaches the full opening degree from the preliminary zone opening degree between timings T3 and T4. During the period, the ECU 26 controls the valve driving motor 23b so that the opening degree of the throttle valve 23 is increased.

As shown in FIG. 8, it is determined in step S6 whether the accelerator opening degree detected by the APS 38 is reduced. If it is determined that the accelerator opening degree is reduced (YES in step S6: in and after timing T4 in FIG. 7), the control proceeds to step S7.

As shown in FIG. 7, during the period before the accelerator opening degree detected by the APS 38 reaches the preliminary zone opening degree from the full opening degree of the thumb throttle 31 (between timings T4 and T5), the ECU 26 controls the valve driving motor 23b so that the opening degree of the throttle valve 23 is reduced.

As shown in FIG. 8, if it is determined that the accelerator opening degree is not reduced (NO in step S6: between timings T3 and T4 in FIG. 7), the control proceeds to step S3. It is determined in step S3 whether the load applied to the thumb throttle 31 detected by the pressure sensor 37 is not less than the threshold value. If the load applied to the thumb throttle 31 is not less than the threshold value (YES in step S3: between timings T2 and T6 in FIG. 7), steps S4 to S6 are repeatedly carried out. In this way, the ECU 26 repeatedly determines whether the load applied to the thumb throttle 31 is not less than the threshold value. It is continuously determined whether operation of the thumb throttle 31 is carried out by the rider.

It is determined in step S7 whether the load applied to the thumb throttle 31 detected by the pressure sensor 37 is less than the threshold value. If the load applied to the thumb throttle 31 is less than the threshold value (YES in step S7: in and after timing T6 in FIG. 7), the control proceeds to step S8 in FIG. 9. If it is determined that the load applied to the thumb throttle 31 is not less than the threshold value (NO in step S7: between timings T4 to T6 in FIG. 7), the control returns to step S3. It is determined in step S3 whether the load applied to the thumb throttle 31 detected by the pressure sensor 37 is not less than the threshold value.

It is determined in step S8 whether the opening degree of the throttle valve 23 detected by the TPS 23a equals the idling opening degree. If it is determined that the opening degree of the throttle valve 23 equals the idling opening degree (YES in step S8: between timings T5 to T7 in FIG. 7), the processing ends.

As shown in FIG. 7, between timings T5 and T7, the accelerator opening degree detected by the APS 38 is reduced from the preliminary zone opening degree to zero. During the period, the accelerator opening degree is within the range of the preliminary zone (electrical idling region), and therefore the ECU 26 controls the valve driving motor 23b so that the opening degree of the throttle valve 23 is maintained at the idling opening degree.

If it is determined in step S8 that the opening degree of the throttle valve 23 does not equal the idling opening degree (is greater than the idling opening degree) (NO in step S8), the control proceeds to step S9. In step S9, the valve driving motor 23b is controlled so that the throttle valve 23 is gradually closed.

If it is determined in step S3 that the load applied to the thumb throttle 31 is less than the threshold value (NO in step S3), the control proceeds to step S11. The ECU 26 determines that the operation of the thumb throttle 31 by the rider is stopped. It is determined in step S11 whether the load detected by the pressure sensor 37 has continued to be less than the threshold value for a prescribed period. If it is determined that the load detected by the pressure sensor 37 has continued to be less than threshold value for a prescribed period (YES in step S11), the control proceeds to step S12. The ECU 26 determines that the operation of the thumb throttle 31 by the rider is no longer carried out.

If it is determined that the state in which the load detected by the pressure sensor 37 is less than the threshold value did not continue for a prescribed period (NO in step S11), it is determined that the operation of the thumb throttle 31 by the rider continues, and the control proceeds to step S4.

It is determined in step S12 whether the throttle valve opening degree detected by the TPS 23a equals the idling opening degree. If it is determined that the throttle valve opening degree equals the idling opening degree (YES in step S12), the control proceeds to step S10. In step S10, the valve driving motor 23b is controlled so that the throttle valve 23 maintains the idling opening degree.

If it is determined that the throttle valve opening degree does not equal the idling opening degree (is greater than the idling degree)(NO in step S12), the control proceeds to step S13 and the valve driving motor 23b is controlled so that the throttle valve 23 is gradually closed.

After the series of processing steps, the control returns to step S1 and the processing is repeated.

According to the present preferred embodiment, the threshold value for operation input is set in the preliminary zone, and it is determined by the pressure sensor 37 whether operation of the thumb throttle 31 is carried out. Unlike the case in which the presence/absence of operation input is detected for a very short period before the rotation operation of the thumb throttle 31, sufficient time can be secured for detecting the presence/absence of operation input. While driving of the engine 4 is electrically controlled by operating the thumb throttle 31, the presence/absence of operation input can be detected accurately by the pressure sensor 37.

When the accelerator opening degree is greater than the preliminary zone opening degree, the ECU 26 carries out engine control using the valve driving motor 23b based on the accelerator opening degree. In the preliminary zone, the presence/absence of operation of the thumb throttle 31 by the pressure sensor 37 is determined. Engine control based on the accelerator opening degree without detecting operation of the thumb throttle 31 can be prevented.

According to the present preferred embodiment, if no operation of the thumb throttle 31 is detected and the throttle valve opening degree detected by the TPS 23a is greater than the idling opening degree in the preliminary zone, the ECU 26 controls the valve driving motor 23b so that the engine 4 is maintained in an idling state. More specifically, the ECU 26 controls the valve driving motor 23b so that the engine speed of the engine 4 is not more than a prescribed engine speed at which the vehicle does not start to move. If no operation of the thumb throttle 31 is carried out and the throttle valve opening degree is greater than the idling opening degree because of freezing or the like, the engine 4 can be kept automatically in an idling state.

According to the present preferred embodiment, the pressure sensor 37 used to detect the load applied to the thumb throttle 31 as pressure is preferably provided. If application of a load equal to or larger than the threshold value to the thumb throttle 31 is determined by the pressure sensor 37, it is determined that operation of the thumb throttle 31 has been carried out. The presence/absence of operation of the thumb throttle 31 based on the rider's explicit intention can be determined.

Approximately a half of the rotation angle of the thumb throttle 31 when reached at the preliminary zone opening degree is set as a reference angle. According to the present preferred embodiment, the threshold value for the load detected by the pressure sensor 37 is set as the load at which the thumb throttle attains the reference angle. The relationship between the load applied to the thumb throttle 31 and the angle of the thumb throttle 31 rotated by the load slightly changes because of change with time in the rotation mechanism of the thumb throttle 31. According to the present preferred embodiment, the threshold value for the load detected by the pressure sensor 37 can be prevented from departing from the preliminary zone even if such change occurs.

According to the present preferred embodiment, if the thumb throttle 31 is operated with a load equal to or greater than the threshold value (in the range of timings T2 to T6 in FIG. 7), the presence/absence of operation input to the thumb throttle 31 continues to be determined by the pressure sensor 37. When the state of the thumb throttle 31 changes from the state in which it is operated with a load at least equal to the threshold value to the state in which it is operated with a load less than the threshold value, control in response to the presence/absence of operation input to the thumb throttle 31 can be carried out.

According to the present preferred embodiment, if the accelerator opening degree detected by the APS 38 is greater than the preliminary zone opening degree, the valve driving motor 23b is controlled at least based on the accelerator opening degree. If the accelerator opening degree detected by the APS 38 exceeds the preliminary zone opening degree, the vehicle can be switched to a traveling state.

According to the present preferred embodiment, if the accelerator opening degree detected by the APS 38 is greater than the preliminary zone opening degree and operation input to the thumb throttle 31 is detected by the pressure sensor 37, the valve driving motor 23b is controlled according to the value produced based on the accelerator opening degree detected by the APS 38 and the preliminary zone opening degree. If the accelerator opening degree detected by the APS 38 exceeds the preliminary zone opening degree, the vehicle can be switched to a traveling state.

According to the present preferred embodiment, if no operation is carried out on the thumb throttle 31 and the throttle valve 23 is controlled based on the accelerator opening degree, the ECU 26 stops engine control based on the accelerator opening degree and controls the valve driving motor 23b so that the throttle valve 23 attains an idling opening degree. If no operation of the thumb throttle 31 is detected and the throttle valve 23 is not at the idling opening degree, the throttle driving motor 23b is controlled automatically so that the throttle valve 23 attains an idling opening degree. In this way, engine control according to the rider's intention can be carried out.

According to the present preferred embodiment, if no operation of the thumb throttle 31 has been detected for a prescribed period and the throttle valve 23 is controlled based on the accelerator opening degree, the driving control based on the accelerator opening degree is stopped. Then, the valve driving motor 23b is controlled so that the throttle valve 23 attains an idling opening degree. The engine 4 can be prevented from attaining an idling state if the rider releases the thumb throttle 31 only for a short period.

According to the present preferred embodiment, if the accelerator opening degree changes from a value greater than the preliminary zone opening degree to a value equal to or smaller than the preliminary zone opening degree, the valve driving motor 23b is controlled so that the engine 4 is maintained in an idling state. During deceleration, control based on the preliminary zone can be carried out.

Note that the "idling state" according to the present preferred embodiment includes a fast idling state in which the engine speed is intentionally increased to warm up the engine 4 from its cold state.

According to the present preferred embodiment, the ECU calculates the accelerator opening degree based on the rotation state of the rotation shaft 33 electrically detected by the APS 38. Then, the valve driving motor 23b is controlled based on the accelerator opening degree. The throttle valve can be controlled without using a mechanism such as a wire.

According to the present preferred embodiment, a snowmobile is described as an example of a vehicle including an engine and an operation portion that controls driving of the engine. The present invention is not limited to the above and may be applied to a straddle type vehicle other than the snowmobile such as an SSV (Side by Side Vehicle) and an ATV (All Terrain Vehicle).

According to the preferred embodiments of the present invention, a pressure sensor used to detect pressure applied by the rider during operation is described as an example of the operation input detector. The present invention is not limited to the above, and a deformation detector such as a distortion gauge that detects deformation at a portion pressurized by the thumb throttle during the rider's operation may be used.

According to the present preferred embodiments of the present invention, the ECU adds the idling opening degree to the value produced based on the accelerator opening degree and the preliminary zone opening degree to produce the opening degree of the throttle valve by way of illustration. The present invention is not limited to the above and a map used to produce the opening degree of the throttle valve based on the relationship between the accelerator opening degree and the preliminary zone opening degree may be used.

According to the preferred embodiments of the present invention, the pressure sensor detects the load in order to determine the presence/absence of operation input to the thumb throttle by the rider. The present invention is not limited to the above and the presence/absence of detection of operation input to the thumb throttle may be determined based on the operation amount (accelerator opening degree) of the thumb throttle operated by the rider. In this way, when operation is carried out with an accelerator opening degree (the operation amount of the thumb throttle) smaller than the preliminary zone opening degree in the preliminary zone, the presence/absence of detection of operation input of the thumb throttle by the rider is determined.

Figure 10:
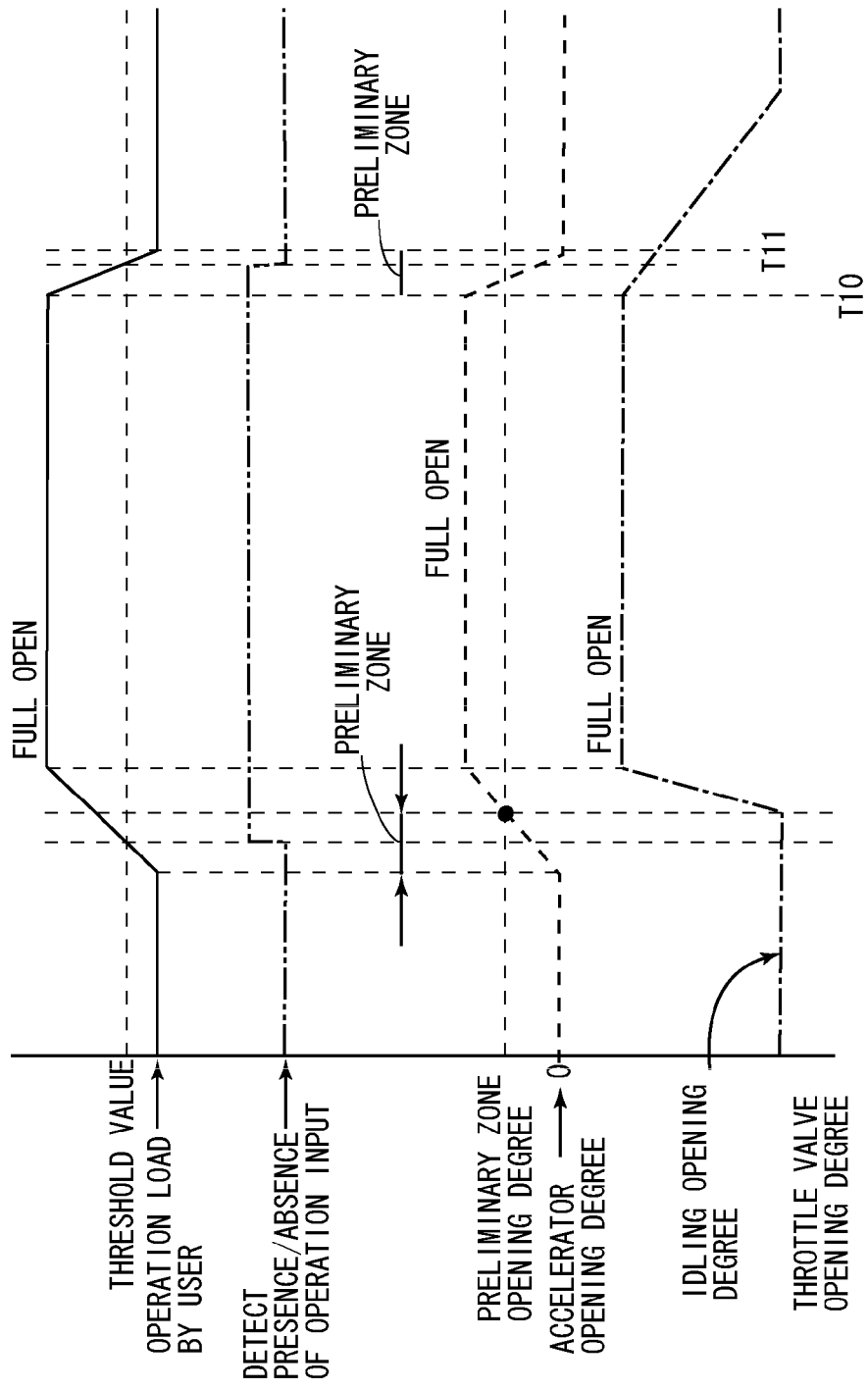
FIG. 10 is a timing chart for illustrating an example of how a throttle lever and a throttle valve operate.

According to the preferred embodiments of the present invention, the thumb throttle is gradually operated (see FIG. 7) by way of illustration. The present invention is not limited to the above and may be applied to the arrangement in which the thumb throttle is abruptly operated. For example, the ECU may be controlled as shown in the timing chart in FIG. 10. In this way, the ECU controls the throttle valve to be gradually closed even if the thumb throttle is suddenly closed and the accelerator opening degree is abruptly dropped in timing T10 in FIG. 10. During such control, if the thumb throttle is fully close and the accelerator opening degree becomes zero in timing T11, the throttle valve is gradually closed. In timing T11, the throttle valve opening degree is greater than the idling opening degree and then the throttle valve is gradually closed until reaching the idling opening degree.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A straddle type vehicle comprising:
an engine;
an engine power controller programmed to control power of the engine;
an operation portion arranged to control the engine;
an operation input detector arranged to detect whether the operation portion is operated;
an operation amount detector arranged to electrically detect an operation amount of the operation portion; and
a control portion programmed to control the engine by controlling the engine power controller based on detection results of the operation input detector and the operation amount detector; wherein
the control portion is programmed not to control the engine power controller based on an operation amount detected by the operation amount detector in a first region in which the operation amount detected by the operation amount detector is at most equal to a first operation amount;
a second operation amount smaller than the first operation amount is set in the first region; and
if an operation amount detected by the operation amount detector is greater than the first operation amount, the control portion is programmed to control the engine power controller based on the operation amount detected by the operation amount detector, provided that operation corresponding to the second operation amount is detected by the operation input detector.

2. The straddle type vehicle according to claim 1, further comprising a control state detector arranged to detect a control state of the engine, wherein the control portion is programmed control the engine power controller so that the engine is maintained in a prescribed state if no operation of the operation portion is detected by the operation input detector and driving of the engine is detected by the control state detector.

3. The straddle type vehicle according to claim 2, wherein the prescribed state includes a state in which a speed of the engine is controlled at most at a prescribed speed that does not allow the vehicle to travel.

4. The straddle type vehicle according to claim 1, wherein the operation input detector is arranged to detect a load applied to the operation portion, a load applied to the operation portion when operation corresponding to the second operation amount is carried out to the operation portion is set as a prescribed load, and the control portion is arranged to determine that operation of the operation portion is carried out, if the operation input detector detects a load applied to the operation portion being at least equal to the prescribed load.

5. The straddle type vehicle according to claim 1, wherein the second operation amount is about a half of the first operation amount.

6. The straddle type vehicle according to claim 1, wherein the control portion is programmed to detect whether the operation portion is operated using the operation input detector, even if an operation amount at least equal to the second operation amount is detected by the operation amount detector.

7. The straddle type vehicle according to claim 1, further comprising a control state detector arranged to detect a control state of the engine, wherein the engine power controller includes:
- an intake control valve arranged to regulate an amount of air to be taken into the engine; and
- a control valve driving portion arranged to open/close the intake control valve, wherein the control state detector includes an opening/closing detector arranged to detect an open/closed state of the intake control valve, and if the operation amount detected by the operation amount detector is greater than the first operation amount, the control portion is programmed to control the control valve driving portion at least based on the operation amount detected by the operation amount detector.

8. The straddle type vehicle according to claim 7, wherein if the operation amount detected by the operation amount detector is greater than the first operation amount and operation of the operation portion is detected by the operation input detector, the control portion is programmed to control the control valve driving portion according to at least a value obtained based on the operation amount detected by the operation amount detector and the first operation amount.

9. The straddle type vehicle according to claim 1, further comprising a control state detector arranged to detect a control state of the engine, wherein the engine power controller includes:
- an intake control valve arranged to regulate an amount of air to be taken into the engine; and
- a control valve driving portion arranged to open/close the intake control valve; wherein
- the control state detector includes an opening/closing detector arranged to detect an open/closed state of the intake control valve; and
- if no operation of the operation portion is detected by the operation input detector and the opening degree of the intake control valve that is at least equal to a prescribed opening degree is detected by the opening/closing detector, the control portion is programmed to control the control valve driving portion so that the engine attains an idling state.

10. The straddle type vehicle according to claim 9, wherein if it is determined that no operation has been detected by the operation input detector for a prescribed period and if it is determined that the opening degree of the intake control valve detected by the opening/closing detector is at least equal to the prescribed opening degree, the control portion is programmed to control the control valve driving portion so that the engine attains an idling state.

11. The straddle type vehicle according to claim 1, wherein the control portion is programmed to control the engine power controller so that the engine is maintained in a prescribed state, if the operation amount detector detects an operation amount that is at most equal to the first operation amount after detecting an operation amount greater than the first operation amount.

12. The straddle type vehicle according to claim 11, wherein the prescribed state includes an idling state.

13. The straddle type vehicle according to claim 1, wherein the operation portion includes a throttle lever arranged to rotate around a rotation shaft, the operation amount detector is arranged to electrically detect a rotation amount of the throttle lever that rotates integrally with the rotation shaft, and the control portion is programmed to determine the operation amount of the operation portion based on the rotation amount of the throttle lever electrically detected by the operation amount detector.

* * * * *